(12) United States Patent
Nagayasu (10) Patent No.: US 8,765,823 B2
(45) Date of Patent: Jul. 1, 2014

(54) METHOD FOR STARTING UP BUBBLE-COLUMN-TYPE SLURRY-BED REACTOR, START-UP SOLVENT, AND METHOD FOR PRODUCING HYDROCARBON OIL

(75) Inventor: Yoshiyuki Nagayasu, Tokyo (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel & Sumikin Engineering Co., Ltd., Tokyo (JP)

( * ) Notice: Subject to any disclaimer, the term of this patent is extended or adjusted under 35 U.S.C. 154(b) by 0 days.

(21) Appl. No.: 14/007,833

(22) PCT Filed: Mar. 26, 2012

(86) PCT No.: PCT/JP2012/057773
§ 371 (c)(1),
(2), (4) Date: Dec. 6, 2013

(87) PCT Pub. No.: WO2012/133325
PCT Pub. Date: Oct. 4, 2012

(65) Prior Publication Data
US 2014/0107231 A1    Apr. 17, 2014

(30) Foreign Application Priority Data
Mar. 31, 2011   (JP) ................................ P2011-080647

(51) Int. Cl.
*C07C 27/00* (2006.01)
*C10L 1/04* (2006.01)
*C10G 71/00* (2006.01)

(52) U.S. Cl.
USPC ............................... 518/700; 208/17; 208/19

(58) Field of Classification Search
USPC ........................ 518/700; 208/17, 19
See application file for complete search history.

(56) References Cited

U.S. PATENT DOCUMENTS

| | | |
|---|---|---|
| 6,974,844 B2 | 12/2005 | Steynberg |
| 7,488,760 B2 | 2/2009 | Vogel |
| 2002/0137805 A1* | 9/2002 | Huang et al. .................. 518/728 |
| 2005/0027020 A1 | 2/2005 | Steynberg |
| 2007/0187292 A1* | 8/2007 | Miller et al. .................... 208/15 |
| 2007/0197667 A1 | 8/2007 | Vogel |
| 2010/0282328 A1 | 11/2010 | Nakashizu et al. |
| 2011/0210046 A1 | 9/2011 | Tanaka et al. |

FOREIGN PATENT DOCUMENTS

| | | |
|---|---|---|
| JP | 2005-517698 | 6/2005 |
| JP | 2007-516065 | 6/2007 |
| WO | 2009/078332 | 6/2009 |
| WO | 2010/038389 | 4/2010 |

OTHER PUBLICATIONS

International Preliminary Report on Patentability for PCT/JP2012/057773, mailed on Oct. 17, 2013.
International Search Report for PCT/JP2012/057773, mailed on May 1, 2012.

* cited by examiner

*Primary Examiner* — Jafar Parsa
(74) *Attorney, Agent, or Firm* — Greenblum & Bernstein, P.L.C.

(57) ABSTRACT

A method for starting up a bubble column slurry bed reactor of the present invention includes, when restarting operation of a bubble column slurry bed reactor for producing hydrocarbons by the Fischer-Tropsch synthesis reaction, feeding a hydroprocessed oil produced in the bubble column slurry bed reactor and hydroprocessed that contains 40% by mass or more of paraffin hydrocarbons having carbon number of 21 or more and that has a peroxide value of 1 ppm or less, to the bubble column slurry bed reactor.

3 Claims, 1 Drawing Sheet

METHOD FOR STARTING UP BUBBLE-COLUMN-TYPE SLURRY-BED REACTOR, START-UP SOLVENT, AND METHOD FOR PRODUCING HYDROCARBON OIL

TECHNICAL FIELD

The present invention relates to a method for starting up a slurry bubble column reactor, a solvent for start-up, and a process for producing a hydrocarbon oil.

BACKGROUND ART

As a process for producing a hydrocarbon oil used as raw materials for liquid fuel products such as a kerosene and gas oil, a method using a Fischer-Tropsch synthesis reaction (hereinafter, also referred to as the "FT synthesis reaction" in some cases) in which synthesis gas containing carbon monoxide gas (CO) and hydrogen gas ($H_2$) as main components is used as raw material gas is known.

As a process for producing a hydrocarbon oil by the FT synthesis reaction, for example, Patent Literature 1 described below discloses a method using a slurry bubble column reactor (a bubble column type slurry bed reactor) in which synthesis gas is blown into a slurry (hereinafter, simply also referred to as the "slurry" in some cases) with solid catalyst particles suspended in liquid hydrocarbons.

In this method, when operation of the slurry bubble column reactor is started, a solvent for start-up such as a wax, liquid paraffin, and a petroleum hydrocarbon solvent is charged into the reactor with a catalyst.

CITATION LIST

Patent Literature

[Patent Literature 1] National Publication of International Patent Application No. 2007-516065

SUMMARY OF INVENTION

Technical Problem

For the solvent for start-up, high purity products are used so as not to have an effect on catalyst activity in the FT synthesis reaction. This cost is required with respect to each starting up of the reactor and also has an effect on production cost of a hydrocarbon oil.

The present invention has been made in consideration of such circumstances, and an object of the present invention is to provide a method for starting up a slurry bubble column reactor and a solvent for start-up, as well as a process for producing a hydrocarbon oil using the starting up method, which can sufficiently maintain activity of a catalyst for the Fischer-Tropsch synthesis reaction using the slurry bubble column reactor and reduce cost needed for starting up the reactor.

Solution to Problem

In order to solve the above-described problem, the present inventor has intensively studied while focusing on using a FT synthetic oil, as a result, has found that a hydroprocessed oil obtained by hydroprocessing a FT synthetic oil so that a peroxide value does not exceed a specified value makes it possible to sufficiently maintain the activity of the catalyst for the Fischer-Tropsch synthesis reaction even when being used as a solvent for start-up, and thus has completed the present invention.

Namely, The present invention provides a method for starting up a slurry bubble column reactor, comprising, when restarting operation of a slurry bubble column reactor for producing hydrocarbons by the Fischer-Tropsch synthesis reaction, feeding a hydroprocessed oil produced in the slurry bubble column reactor and hydroprocessed that contains 40% by mass or more of paraffin hydrocarbons having carbon number of 21 or more and that has a peroxide value of 1 ppm or less, to the slurry bubble column reactor.

According to the method for starting up a slurry bubble column reactor of the present invention, the particular a FT synthetic oil as described above is used, thereby making it possible to sufficiently maintain the activity of the catalyst for the Fischer-Tropsch synthesis reaction, and to reduce the cost needed for starting up the reactor.

The present invention also provides a solvent for start-up for use in starting operation of a slurry bubble column reactor for producing hydrocarbons by the Fischer-Tropsch synthesis reaction, the solvent comprising a hydroprocessed oil produced in the slurry bubble column reactor and hydroprocessed that contains 40% by mass or more of paraffin hydrocarbons having carbon number of 21 or more and that has a peroxide value of 1 ppm or less.

The present invention also provides a process for producing a hydrocarbon oil using a slurry bubble column reactor for producing hydrocarbons by the Fischer-Tropsch synthesis reaction, comprising performing restarting operation of the reactor by the starting up method of the present invention.

According to the process for producing a hydrocarbon oil of the present invention, it is possible to sufficiently maintain the activity of the catalyst for the Fischer-Tropsch synthesis reaction and to reduce the cost needed for starting up the reactor, and to produce a hydrocarbon oil with a sufficient reaction efficiency and low cost.

Advantageous Effects of Invention

According to the present invention, a method for starting up a slurry bubble column reactor, a solvent for start-up, and a process for producing a hydrocarbon oil which can produce a hydrocarbon oil with efficiency and low cost, which can sufficiently maintain the activity of the catalyst for the Fischer-Tropsch synthesis reaction using the slurry bubble column reactor and reduce the cost needed for starting up the reactor can be provided.

DESCRIPTION OF EMBODIMENTS

Figure 1:
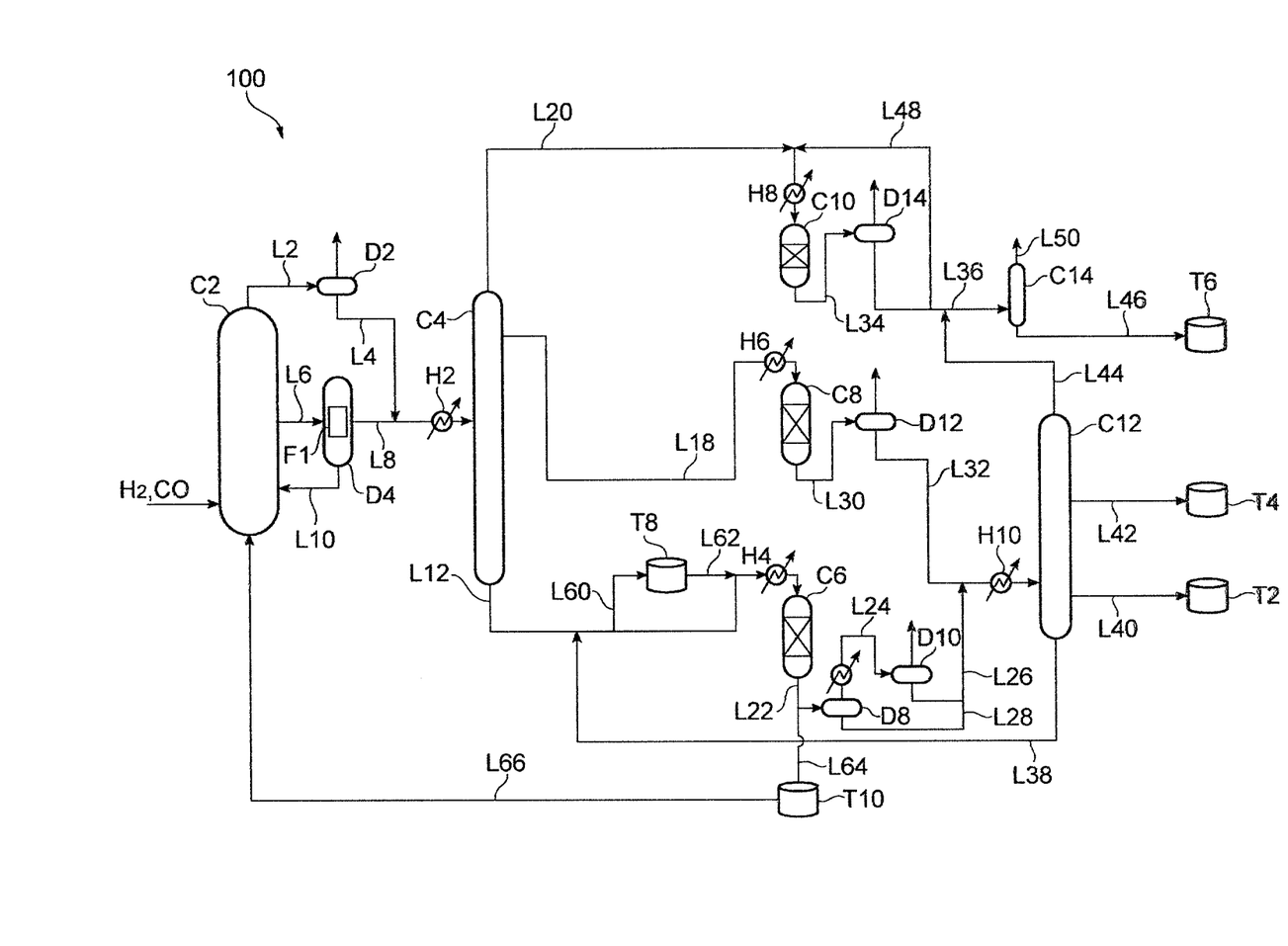
FIG. 1 is a schematic view showing one embodiment of a system for producing a hydrocarbon oil in which a method for starting up a slurry bubble column reactor according to the present invention is performed.

Hereinafter, the present invention will be described with reference to FIG. 1. FIG. 1 is a schematic view showing one embodiment of a system for producing a hydrocarbon oil in which a method for starting up a slurry bubble column reactor according to the present invention is performed. Here, same reference numerals will be given to same or identical components.

A system for producing a hydrocarbon oil 100 used in the present embodiment is a plant facility for performing a GTL process that converts a hydrocarbon raw material such as natural gas into a base stock for liquid fuel (hydrocarbon oil) such as gas oil, kerosene, and naphtha. The system for producing a hydrocarbon oil 100 of the present embodiment mainly includes a reformer (not shown), a slurry bubble column reactor (a bubble column type slurry bed reactor) C2, a first fractionator C4, a hydrocracking apparatus C6, a middle distillate hydrotreating apparatus C8, a naphtha fraction hydrotreating apparatus C10 and a second fractionator C12, as well as a raw wax storage tank T8 and a hydroprocessed oil storage tank T10. The first fractionator C4 is connected to a transferring line L12 for feeding a raw wax fractionated in the first fractionator C4 to the hydrocracking apparatus C6. The raw wax storage tank T8 temporarily stores the raw wax fractionated in the first fractionator C4, and is connected to a transferring line L60 connected to the transferring line L12. Moreover, the raw wax storage tank T8 is connected to a transferring line L62 for feeding the raw wax to the hydrocracking apparatus C6. The hydrocracking apparatus C6 is connected to a transferring line L22 for transferring a hydroprocessed raw wax to the following stage. The hydroprocessed oil storage tank T10 temporarily stores the hydroprocessed raw wax (hydroprocessed oil), and is connected to a transferring line L64 connected to the transferring line L22. Moreover, the hydroprocessed oil storage tank T10 is connected to a transferring line L66 for feeding the hydroprocessed oil to the slurry bubble column reactor C2. Here, the "line" means a piping for transferring a fluid.

First, The process for producing a hydrocarbon oil according to the present embodiment using the production system 100 will be described. The method according to the present embodiment includes the following Steps S1 to S7.

In Step S1, natural gas as a hydrocarbon raw material is reformed in the reformer (not shown) to produce synthesis gas containing carbon monoxide gas and hydrogen gas.

In Step S2, in the slurry bubble column reactor C2, an FT synthetic oil is synthesized from the synthesis gas obtained in Step S1 by the FT synthesis reaction using a FT synthesis catalyst.

In Step S3, the FT synthetic oil obtained in Step S2 is fractionated into a distilled oil and a bottom oil in the first fractionator C4. In the present embodiment, by this fractionation, the FT synthetic oil is separated into a raw naphtha fraction, a raw middle distillate, and a raw wax fraction. Here, the raw naphtha fraction and the raw middle distillate are distilled oils each evacuated in the first fractionator C4 from a top and a middle of the first fractionator C4, and the raw wax fraction is a bottom oil evacuated from a bottom thereof. Here, the raw naphtha fraction, the raw middle distillate and the raw wax fraction each refer to a fraction which is obtained from the FT synthesis oil by fractionation and does not undergo hydrotreating or hydrocracking treatment.

In Step S4, hydrocracking of the raw wax fraction separated in Step S3 is performed in the hydrocracking apparatus C6.

In Step S5, hydrotreating of the raw middle distillate separated in Step S3 is performed in the middle distillate hydrotreating apparatus C8.

In Step S6, hydrotreating of the raw naphtha fraction is performed in the naphtha fraction hydrotreating apparatus C10. Further, the hydrotreated naphtha fraction is fractionated in a naphtha stabilizer C14 and naphtha (GTL-naphtha) that is a product of the GTL process is recovered.

In Step S7, a mixture of a hydrocracking product of the raw wax fraction and a hydrotreated product of the raw middle distillate is fractionated in the second fractionator C12. By the fractionation, a base stock for gas oil (GTL-gas oil) and a base stock for kerosene (GTL-kerosene) that are products of the GTL process are recovered.

Hereinafter, each of Step S1 to S7 will be described in more detail.

(Step S1)

In Step S1, first, a sulfur compound contained in natural gas is removed by a desulfurization apparatus (not shown). Usually, the desulfurization apparatus is configured by a hydrogenation desulfurization reactor packed with a known hydrogenation desulfurization catalyst and an adsorptive desulfurization apparatus provided at the following stage thereof and packed with an adsorptive material for hydrogen sulfide such as zinc oxide. The natural gas is fed to the hydrogenation desulfurization reactor with hydrogen, and the sulfur compound in the natural gas is converted into hydrogen sulfide. Subsequently, in the adsorptive desulfurization apparatus, the hydrogen sulfide is removed by adsorption, and the natural gas is desulfurized. By the desulfurization of the natural gas, poisoning of a reforming catalyst packed in the reformer, the FT synthesis catalyst to be used in Step S2, and the like by the sulfur compound is prevented.

The desulfurized natural gas is subjected to reforming using carbon dioxide and steam in the reformer to produce synthesis gas at a high temperature containing carbon monoxide gas and hydrogen gas as main components. The reforming reaction of the natural gas in Step S1 is represented by the following chemical reaction formulae (1) and (2). It is to be noted that the reforming method is not limited to a steam/carbon dioxide gas reforming method using carbon dioxide and steam; for example, a steam reforming method, a partial oxidation reforming method (POX) using oxygen, an autothermal reforming method (ATR) that is a combination of the partial oxidation reforming method and the steam reforming method, a carbon dioxide gas reforming method, or the like can be also used.

$$CH_4 + H_2O \rightarrow CO + 3H_2 \quad (1)$$

$$CH_4 + CO_2 \rightarrow 2CO + 2H_2 \quad (2)$$

(Step S2)

In Step S2, the synthesis gas produced in Step S1 is fed to the slurry bubble column reactor C2, and hydrocarbons are synthesized from hydrogen gas and carbon monoxide gas in the synthesis gas.

A bubble column type slurry bed FT reaction system including the slurry bubble column reactor C2 mainly includes the slurry bubble column reactor C2 that accommodates a slurry containing the FT synthesis catalyst, a gas feeder (not shown) that blows the synthesis gas into a bottom portion of the reactor, a line L2 that evacuates the gaseous hydrocarbons which are obtained by the FT synthesis reaction and the unreacted synthesis gas from a top of the slurry bubble column reactor C2, a gas liquid separator D2 that cools the gaseous hydrocarbons and the unreacted synthesis gas evacuated from the line L2, and separates a condensed liquid component and a gaseous component into gas and liquid, and a effluent pipe L6 that evacuates the slurry containing the liquid hydrocarbons including a wax (heavy liquid hydrocarbons) and the FT synthesis catalyst from the reactor, for example. Moreover, inside of the slurry bubble column reactor C2, a heat conducting pipe (not shown) for removing reaction heat generated by the FT synthesis reaction, through which cool water is flowed, is provided.

As the FT synthesis catalyst used in the slurry bubble column reactor C2, a known supported type FT synthesis catalyst in which an active metal is supported by an inorganic oxide catalyst support is used. As the inorganic oxide catalyst support, porous oxides such as silica, alumina, titania, magnesia, and zirconia are used; silica or alumina is preferable, and silica is more preferable. Examples of the active metal include cobalt, ruthenium, iron, and nickel; cobalt and/or ruthenium is preferable, and cobalt is more preferable. The amount of the active metal to be supported is preferably 3 to 50% by mass and more preferably 10 to 40% by mass based on the mass of the catalyst support. In the case where the amount of the active metal to be supported is less than 3% by mass, the activity tends to be insufficient; and in the case where the amount of the active metal to be supported is more than 50% by mass, the activity tends to be reduced by aggregation of the active metal. Further, in addition to the above-described active metal, other components may be supported in the FT synthesis catalyst for the purpose of improving the activity or controlling a carbon number of hydrocarbons to be produced and a distribution thereof. Examples of the other component include a compound containing a metal element such as zirconium, titanium, hafnium, sodium, lithium, and magnesium. It is preferable that the average particle size of the FT synthesis catalyst particles be 40 to 150 μm so that the catalyst particles may easily flow within the slurry bed reactor as a slurry suspended in the liquid hydrocarbons. It is also preferable that, from the viewpoint of the fluidity as the slurry, the shape of the FT synthesis catalyst particles be spherical.

The active metal is supported by a catalyst support by a known method. Examples of a compound containing the active metal element used upon supporting can include salts of mineral acid of an active metal, such as nitric acid salts, hydrochloric acid salts, and sulfuric acid salts; salts of organic acid such as formic acid, acetic acid, and propionic acid; and complex compounds such as acetylacetonate complexes. A supporting method is not particularly limited, but an impregnation method represented by an Incipient Wetness method using a solution of a compound containing an active metal element is preferably adopted. The catalyst support by which the compound containing an active metal element is supported is dried by a known method, and more preferably calcined under an air atmosphere by a known method. A calcination temperature is not particularly limited, and generally about 300 to 600° C. By calcination, the compound containing an active metal element on the catalyst support is converted into metal oxide.

In order to allow the FT synthesis catalyst to exert high activity to the FT synthesis reaction, it is necessary that the active metal atom be converted into a metal by reduction of the catalyst in which the active metal atom is oxidized. The reduction is usually performed by bringing the catalyst in contact with reducing gas under heating. Examples of the reducing gas include hydrogen gas, gas containing hydrogen gas, such as mixed gas of hydrogen gas and inert gas such as nitrogen gas, and carbon monoxide gas; preferable is hydrogen containing gas, and more preferable is hydrogen gas. A temperature in the reduction is not particularly limited, but it is preferably generally 200 to 550° C. In the case where the reduction temperature is lower than 200° C., the active metal atom tends not to be sufficiently reduced and not to sufficiently exert the catalyst activity; and in the case where the temperature is higher than 550° C., the catalyst activity tends to be reduced due to aggregation of the active metal or the like. A pressure in the reduction is not particularly limited, but it is preferably generally 0.1 to 10 MPa. In the case where the pressure is lower than 0.1 MPa, the active metal atom tends not to be sufficiently reduced and not to sufficiently exert the catalyst activity; and in the case where the pressure is higher than 10 MPa, facility cost tends to be increased for a need to increase pressure resistance of the apparatus. A time for the reduction is not particularly limited, but it is preferably generally 0.5 to 50 hours. In the case where the reduction time is less than 0.5 hours, the active metal atom tends not to be sufficiently reduced and not to sufficiently exert the catalyst activity; and in the case where the reduction time is more than 50 hours, the catalyst activity tends to be reduced due to aggregation of the active metal or the like, and the efficiency tends to be reduced. A facility in which the reduction is performed is not particularly limited, but, for example, the reduction may be performed in the absence of the liquid hydrocarbons within the reactor that performs the FT synthesis reaction. Moreover, the reduction may be performed within a facility connected to the reactor that performs the FT synthesis reaction, and the catalyst may be transferred through a piping to the reactor that performs the FT synthesis, without being contact with the air.

On the other hand, in the case where the reduction is performed in a facility located in a place different from that of the facility that performs the FT synthesis reaction such as a catalyst production facility, the catalyst activated by the reduction is deactivated if the catalyst is brought into contact with the air during transportation or the like. In order to prevent this, the activated catalyst is subjected to a stabilization treatment to prevent deactivation caused by contact with the air. Examples of the stabilization treatment include a method for subjecting an activated catalyst to a light oxidation treatment to form an oxidation coating on a surface of an active metal so that oxidation due to contact with the air does not further proceed, or a method for coating an activated catalyst with a hydrocarbon wax or the like without being contact with the air to block contact with the air. In the method for forming an oxidation coating, the catalyst can be subjected to the FT synthesis reaction as it is after transportation; and also in the method for performing covering with wax or the like, when the catalyst is suspended in liquid hydrocarbons to form a slurry, the wax or the like used for covering is dissolved in the liquid hydrocarbons, and the activity is exerted.

A reaction condition on the FT synthesis reaction in the slurry bubble column reactor C2 is not limited, but, for example, the following reaction condition is selected. Namely, it is preferable that a reaction temperature be 150 to 300° C. from the viewpoint of increase in the conversion of carbon monoxide and a carbon number of hydrocarbons to be produced. It is preferable that a reaction pressure be 0.5 to 5.0 MPa. It is preferable that a ratio (molar ratio) of hydrogen/carbon monoxide in raw material gas be 0.5 to 4.0. Here, it is desirable that the conversion of carbon monoxide be not less than 50% from the viewpoint of the production efficiency of the FT synthetic oil.

Inside of the slurry bubble column reactor C2, a slurry in which the FT synthesis catalyst particles are suspended in the liquid hydrocarbons (product of the FT synthesis reaction) is accommodated. The synthesis gas (CO and $H_2$) obtained in Step S1 is injected into the slurry within the reactor through a dispersion plate installed in the bottom portion of the slurry bubble column reactor C2. The synthesis gas blown into the slurry turns to bubbles, which move upward in the slurry to the upper portion of the slurry bubble column reactor C2. In the course thereof, the synthesis gas is dissolved in the liquid hydrocarbons to be contact with the FT synthesis catalyst particles, thereby, the FT synthesis reaction proceeds to produce hydrocarbons. The FT synthesis reaction is represented by the following chemical reaction equation (3), for example.

$$2nH_2 + nCO \rightarrow (-CH_2-)_n + nH_2O \qquad (3)$$

A gaseous phase portion exists in the upper portion of the slurry accommodated in the slurry bubble column reactor C2. The light hydrocarbons which are produced by the FT synthesis reaction and are gaseous under the condition within the slurry bubble column reactor C2 and the unreacted synthesis gas (CO and $H_2$) move from a slurry phase to this gaseous phase portion, and are further evacuated from the top portion of the slurry bubble column reactor C2 through the line L2. Then, the evacuated light hydrocarbons and unreacted synthesis gas are separated by the gas liquid separator D2 including a cooler (not shown) connected to the line L2 into a gas fraction containing the unreacted synthesis gas and hydrocarbon gas having $C_4$ or less as main components and liquid hydrocarbons (light hydrocarbons) liquefied by cooling. Of these, the gas fraction is recycled to the slurry bubble column reactor C2, and the unreacted synthesis gas contained in the gas fraction is subjected to the FT synthesis reaction again. On the other hand, the light hydrocarbons are fed through the line L4 and a line L8 to the first fractionator C4.

On the other hand, a slurry containing hydrocarbons (heavy hydrocarbon oil) produced by the FT synthesis reaction, which are in a liquid state under the condition within the slurry bubble column reactor C2, and the FT synthesis catalyst particles is fed from a central portion of the slurry bubble column reactor C2 through the line L6 to a catalyst separator D4.

As the product of the FT synthesis reaction, hydrocarbons (light hydrocarbons) which are gaseous under the condition within the slurry bubble column reactor C2 and hydrocarbons (heavy hydrocarbon oil) which are in a liquid state under the condition within the slurry bubble column reactor C2 are obtained. These hydrocarbons are substantially normal paraffins, and few aromatic hydrocarbons, naphthene hydrocarbons and isoparaffins are contained. Distribution of a carbon number of the light hydrocarbons and heavy hydrocarbon oil in total widely ranges from $C_4$ or less as gas at normal temperature to approximately $C_{80}$, for example, as a solid (wax) at room temperature. The product of the FT synthesis reaction also contains olefins and oxygen-containing compounds containing oxygen atoms derived from carbon monoxide (e.g., alcohols) as by-products.

As long as the opening of the filter F1 provided in the catalyst separator D4 is less than the particle size of the FT synthesis catalyst particle, the size of the opening is not particularly limited, but it is preferably 10 to 20 µm and more preferably 10 to 15 µm. The FT synthesis catalyst particles captured by the filter provided in the catalyst separator D4 are returned through the line L10 to the slurry bubble column reactor C2 by properly flowing liquid hydrocarbons in a direction opposite to the ordinary flow direction (backwashing), and reused.

(Step S3)

In Step S3, a hydrocarbon oil (FT synthetic oil) comprising a mixture of the light hydrocarbon oil and the heavy hydrocarbon oil fed from the slurry bubble column reactor C2 is fractionated in the first fractionator C4. By this fractionation, the FT synthetic oil is separated into a raw naphtha fraction having approximately $C_5$ to $C_{10}$, with a boiling point of lower than 150° C., a raw middle distillate having approximately $C_{11}$ to $C_{20}$, with a boiling point of about 150 to 360° C., and a raw wax fraction having approximately not less than $C_{21}$, with a boiling point of higher than about 360° C.

The raw naphtha fraction is evacuated through a line L20 connected to a top of the first fractionator C4. The raw middle distillate is evacuated through a line L18 connected to a central portion of the first fractionator C4. The raw wax fraction is evacuated through a line L12 connected to a bottom portion of the first fractionator C4.

(Step S4)

The raw wax fraction transferred from the first fractionator C4 in Step S4 is heated, with hydrogen gas fed by a feed line (not shown) for hydrogen gas connected to the line L12, to a temperature necessary for hydrocracking of the raw wax fraction by a heat exchanger H4 provided on the line L12, and then fed to the hydrocracking apparatus C6 to be hydrocracked. The raw wax fraction not sufficiently hydrocracked in the hydrocracking apparatus C6 (hereinafter, optionally referred to as the "uncracked wax fraction") is recovered as a bottom oil of the second fractionator C12 in Step S8, recycled by a line L38 to the line L12, and fed to the hydrocracking apparatus C6 again.

The type of the hydrocracking apparatus C6 is not particularly limited, and a fixed bed flow reactor packed with a hydrocracking catalyst is preferably used. The reactor may be singular, or a plurality of reactors may be provided in serial or in parallel. Moreover, the catalyst bed within the reactor may be singular or plural.

As the hydrocracking catalyst packed in the hydrocracking apparatus C6, a known hydrocracking catalyst is used, and a catalyst in which a metal that is an element having hydrogenation activity and belongs to Group 8 to Group 10 in the periodic table is supported by an inorganic catalyst support having solid acidity is preferably used.

Examples of the inorganic catalyst support that constitutes the hydrocracking catalyst and has suitable solid acidity include those constituted from zeolites such as ultrastable Y-type (USY) zeolite, Y-type zeolite, mordenite, and β zeolite, and one or more inorganic compounds selected from amorphous composite metal oxides having heat resistance such as silica alumina, silica zirconia, and alumina boria. Further, as the catalyst support, compositions constituted by comprising USY zeolite, and one or more amorphous composite metal oxides selected from silica alumina, alumina boria, and silica zirconia are more preferable, and compositions constituted by comprising USY zeolite and alumina boria and/or silica alumina are still more preferable.

USY zeolite is one obtained by ultra-stabilizing Y-type zeolite by a hydrothermal treatment and/or an acid treatment; in addition to a fine porous structure called micro pores that Y-type zeolite originally has and whose pore size is not larger than 2 nm, new pores having a pore size in the range of 2 to 10 nm are formed. The average particle size of USY zeolite is not particularly limited, but it is preferably not larger than 1.0 µm, and more preferably not larger than 0.5 µm. Moreover, in USY zeolite, it is preferable that a molar ratio of silica/alumina (molar ratio of silica to alumina) be 10 to 200, it is more preferable that the molar ratio be 15 to 100, and it is still more preferable that the molar ratio be 20 to 60.

Moreover, it is preferable that the catalyst support contain 0.1 to 80% by mass of a crystalline zeolite and 0.1 to 60% by mass of an amorphous composite metal oxide having heat resistance.

The catalyst support can be produced as follows: a catalyst support comprising the inorganic compound having solid acidity and a binder is molded, and calcined. A proportion of the inorganic compound having solid acidity to be compounded is preferably 1 to 70% by mass, and more preferably 2 to 60% by mass based on the entire mass of the catalyst support. Moreover, in the case where the catalyst support contains USY zeolite, a proportion of USY zeolite to be compounded is preferably 0.1 to 10% by mass, and more preferably 0.5 to 5% by mass based on the entire mass of the catalyst support. Further, in the case where the catalyst support contains USY zeolite and alumina boria, it is preferable that a proportion of USY zeolite to alumina boria to be compounded (USY zeolite/alumina boria) be 0.03 to 1 in the mass ratio. Moreover, in the case where the catalyst support contains USY zeolite and silica alumina, it is preferable that a proportion of USY zeolite to silica alumina to be compounded (USY zeolite/silica alumina) be 0.03 to 1 in the mass ratio.

The binder is not particularly limited, but alumina, silica, titania, and magnesia are preferable, and alumina is more preferable. An amount of the binder to be compounded is preferably 20 to 98% by mass and more preferably 30 to 96% by mass based on the entire mass of the catalyst support.

A temperature in calcining the catalyst support is preferably in the range of 400 to 550° C., more preferably in the range of 470 to 530° C., and still more preferably in the range of 490 to 530° C. Calcination at such a temperature can give sufficient solid acidity and mechanical strength to the catalyst support.

Examples of Groups 8 to 10 metals in the periodic table supported by the catalyst support and having hydrogenation activity specifically include cobalt, nickel, rhodium, palladium, iridium, and platinum. Among them, metals selected from nickel, palladium, and platinum are preferably used individually or in combinations of two or more. These metals can be supported on the catalyst support mentioned above by a standard method such as impregnation and ion exchange. An amount of the metal to be supported is not particularly limited, but it is preferable that the entire amount of the metal be 0.1 to 3.0% by mass based on the mass of the catalyst support. Here, the periodic table of the elements refers to the long form of the periodic table of the elements based on the specification by IUPAC (the International Union of Pure and Applied Chemistry).

In the hydrocracking apparatus C6, while the raw wax fraction and a part of the uncracked wax fraction (hydrocarbons having approximately $C_{21}$ or more) are converted into hydrocarbons having approximately $C_{20}$ or less by hydrocracking, further, a part thereof is converted into a naphtha fraction (approximately $C_5$ to $C_{10}$) lighter than the target middle distillate (approximately $C_{11}$ to $C_{20}$) and further gaseous hydrocarbons having $C_4$ or less by excessive cracking. On the other hand, the raw wax fraction and a part of the uncracked wax fraction do not undergo hydrocracking sufficiently, and turn to an uncracked wax fraction having approximately $C_{21}$ or more. The composition of the hydrocracking product is determined according to the hydrocracking catalyst to be used and the hydrocracking reaction condition. Here, the "hydrocracking product" refers to all hydrocracking products containing the uncracked wax fraction, unless otherwise specified. If the hydrocracking reaction condition is tighter than necessary, the content of the uncracked wax fraction in the hydrocracking product is reduced while a light fraction equal to or lighter than the naphtha fraction is increased to reduce the yield of the target middle distillate. On the other hand, if the hydrocracking reaction condition is milder than necessary, the uncracked wax fraction is increased to reduce the yield of the middle distillate. In the case where a ratio M2/M1 of a mass M2 of the cracking product with a boiling point of 25 to 360° C. to a mass M1 of all cracking products with a boiling point of 25° C. or higher is defined as a "cracking rate," the reaction condition is selected so that the cracking ratio M2/M1 may be usually 20 to 90%, preferably 30 to 80%, and more preferably 45 to 70%.

In the hydrocracking apparatus C6, in parallel with the hydrocracking reaction, a hydro-isomerization reaction of normal paraffins that constitute the raw wax fraction and the uncracked wax fraction or the hydrocracking products thereof proceeds to produce isoparaffins. In the case where the hydrocracking product is used as a base stock for fuel oil, isoparaffins to be produced by the hydro-isomerization reaction is a component that contributes to improvement in cold flow property (fluidity in a low temperature), and it is preferable that the production rate be high. Further, removal of olefins and oxygen-containing compounds such as alcohols that are by-products of the FT synthesis reaction contained in the raw wax fraction also proceeds. Namely, the olefins are converted into paraffin hydrocarbons by hydrogenation, and the oxygen-containing compounds are converted into paraffin hydrocarbons and water by hydrogenation deoxidation.

The reaction condition in the hydrocracking apparatus C6 is not limited, but the following reaction condition can be selected. Namely, examples of a reaction temperature include 180 to 400° C., 200 to 370° C. is preferable, 250 to 350° C. is more preferable, and 280 to 350° C. is particularly preferable. If the reaction temperature is higher than 400° C., not only cracking into the light fraction tends to proceed to reduce the yield of the middle distillate, but also the product tends to be colored and to be restricted to use as the base stock for fuel oil. On the other hand, if the reaction temperature is lower than 180° C., not only the hydrocracking reaction tends not to proceed sufficiently and the yield of the middle distillate tends to be reduced, but also production of isoparaffins by the hydro-isomerization reaction tends to be suppressed and oxygen-containing compounds such as alcohols tend not to sufficiently be removed to remain. Examples of a hydrogen partial pressure include 0.5 to 12 MPa, and 1.0 to 5.0 MPa is preferable. If the hydrogen partial pressure is lower than 0.5 MPa, hydrocracking and hydro-isomerization tend not to sufficiently proceed, on the other hand, if the hydrogen partial pressure is higher than 12 MPa, high pressure resistance is demanded for the apparatus, and facility cost tends to be increased. Examples of a liquid hourly space velocity (LHSV) of the raw wax fraction and the uncracked wax fraction include 0.1 to 10.0 $h^{-1}$, and 0.3 to 3.5 $h^{-1}$ is preferable. If the LHSV is lower than 0.1 $h^{-1}$, hydrocracking tends to excessively proceed and productivity tends to be reduced, on the other hand, if the LHSV is higher than 10.0 $h^{-1}$, hydrocracking and hydro-isomerization tend not to sufficiently proceed. Examples of a ratio of hydrogen/oil include 50 to 1000 NL/L, and 70 to 800 NL/L is preferable. If the ratio of hydrogen/oil is lower than 50 NL/L, hydrocracking and hydro-isomerization tend not to sufficiently proceed, on the other hand, if the ratio of hydrogen/oil is higher than 1000 NL/L, a large-sized hydrogen feeding apparatus and the like tend to be needed.

In this example, the hydrocracking product and unreacted hydrogen gas flowed from the hydrocracking apparatus C6 are cooled, and separated into gas and liquid at two stages by a gas liquid separator D8 and a gas liquid separator D10, relatively heavy liquid hydrocarbons containing the uncracked wax fraction is obtained from the gas liquid separator D8, and a gas fraction mainly containing hydrogen gas and gaseous hydrocarbons having $C_4$ or less and relatively light liquid hydrocarbons are obtained from the gas liquid separator D10. By such two-stage cooling and gas liquid separation, clogging of the line accompanied by solidification by rapid cooling of the uncracked wax fraction contained in the hydrocracking product can be prevented from occurring. The liquid hydrocarbons each obtained in the gas liquid separator D8 and the gas liquid separator D10 mix with a line L32 through a line L28 and a line L26, respectively. A gaseous content mainly containing hydrogen gas and gaseous hydrocarbons with $C_4$ or less separated in a gas liquid separator D12 is fed to the middle distillate hydrotreating apparatus C8 and the naphtha fraction hydrotreating apparatus C10 through a line (not shown) connecting the gas liquid separator D10 to the line L18 and a line L20, and the hydrogen gas is reused.

(Step S5)

The raw middle distillate evacuated from the first fractionator C4 by the line L18 is heated, with the hydrogen gas fed by a feed line (not shown) of the hydrogen gas connected to the line L18, to a temperature needed for hydrotreating of the raw middle distillate by a heat exchanger H6 installed in the line L18, and then fed to the middle distillate hydrotreating apparatus C8 to be hydrotreated.

The type of the middle distillate hydrotreating apparatus C8 is not particularly limited, and a fixed bed flow reactor packed with a hydrotreating catalyst is preferably used. The reactor may be singular, or a plurality of reactors may be provided in serial or in parallel. Moreover, the catalyst bed within the reactor may be singular or plural.

As the hydrotreating catalyst used in the middle distillate hydrotreating apparatus C8, catalysts usually used for hydrotreating and/or hydro-isomerization in petroleum refining or the like, namely, the catalysts in which a metal having hydrogenation activity is supported by an inorganic catalyst support can be used.

As the metal having hydrogenation activity that constitutes the hydrotreating catalyst, one or more metals selected from the group consisting of metals in Groups 6, 8, 9, and 10 in the periodic table of the elements are used. Specific examples of these metals include noble metals such as platinum, palladium, rhodium, ruthenium, iridium, and osmium, or cobalt, nickel, molybdenum, tungsten, and iron; preferable are platinum, palladium, nickel, cobalt, molybdenum, and tungsten, and more preferable are platinum and palladium. Moreover, a plurality of these metals are also preferably used in combination; examples of a preferable combination in this case include platinum-palladium, cobalt-molybdenum, nickel-molybdenum, nickel-cobalt-molybdenum, and nickel-tungsten.

Examples of the inorganic catalyst support that constitutes the hydrotreating catalyst include metal oxides such as alumina, silica, titania, zirconia, and boria. These metal oxides may be used individually, or used as a mixture of two or more thereof, or a composite metal oxide such as silica alumina, silica zirconia, alumina zirconia, and alumina boria. From the viewpoint of efficiently proceeding hydro-isomerization of normal paraffins at the same time with hydrotreating, it is preferable that the inorganic catalyst support be a composite metal oxide having solid acidity such as silica alumina, silica zirconia, alumina zirconia, and alumina boria. Moreover, a small amount of zeolite may be contained in the inorganic catalyst support. Further, in order to enhance the moldability and mechanical strength of the catalyst support, a binder may be compounded in the inorganic catalyst support. Examples of a preferable binder include alumina, silica, and magnesia.

In the case where the metal is the above-described noble metal, it is preferable that a content of the metal having hydrogenation activity in the hydrotreating catalyst be approximately 0.1 to 3% by mass as a metal atom based on the mass of the catalyst support. Moreover, in the case where the metal is a metal other than the above-described noble metal, it is preferable that the content be approximately 2 to 50% by mass as a metal oxide based on the mass of the catalyst support. In the case where the content of the metal having hydrogenation activity is less than the lower limit value, hydrotreating and hydro-isomerization tend not to sufficiently proceed. On the other hand, in the case where the content of the metal having hydrogenation activity is more than the upper limit value, dispersion of the metal having hydrogenation activity tends to be reduced to reduce the activity of the catalyst, and cost of the catalyst is increased.

In the middle distillate hydrotreating apparatus C8, the raw middle distillate (which contains normal paraffins with approximately $C_{11}$ to $C_{20}$ as a main component) is hydrotreated. In this hydrotreating, olefins that are a by-product of the FT synthesis reaction contained in the raw middle distillate are hydrogenated to be converted into paraffin hydrocarbons. Moreover, oxygen-containing compounds such as alcohols are converted into paraffin hydrocarbons and water by a hydrogenation deoxidation reaction. Moreover, in parallel with the hydrotreating, the hydro-isomerization reaction of normal paraffins that constitute the raw middle distillate proceeds to produce isoparaffins. In the case where the middle distillate is used as the base stock for fuel oil, the isoparaffins produced by the hydro-isomerization reaction are a component contributing to improvement in cold flow property, and it is preferable that the production rate be high.

The reaction condition in the middle distillate hydrogen refining reactor C8 is not limited, but the following reaction condition can be selected. Namely, examples of a reaction temperature include 180 to 400° C., 200 to 370° C. is preferable, 250 to 350° C. is more preferable, and 280 to 350° C. is particularly preferable. If the reaction temperature is higher than 400° C., not only cracking into the light fraction tends to proceed to reduce the yield of the middle distillate, but also the product tends to be colored and to be restricted to use as the base stock for fuel oil. On the other hand, if the reaction temperature is lower than 180° C., oxygen-containing compounds such as alcohols tend not to sufficiently be removed to remain, and production of isoparaffins by the hydro-isomerization reaction tends to be suppressed. Examples of a hydrogen partial pressure include 0.5 to 12 MPa, and 1.0 to 5.0 MPa is preferable. If the hydrogen partial pressure is lower than 0.5 MPa, hydrotreating and hydro-isomerization tend not to sufficiently proceed, on the other hand, if the hydrogen partial pressure is higher than 12 MPa, high pressure resistance is demanded for the apparatus, and facility cost tends to be increased. Examples of a liquid hourly space velocity (LHSV) of the raw middle distillate include 0.1 to 10.0 $h^{-1}$, and 0.3 to 3.5 $h^{-1}$ is preferable. If the LHSV is lower than 0.1 $h^{-1}$, cracking into the light fraction tends to proceed to reduce the yield of the middle distillate, and productivity tends to be reduced, on the other hand, if the LHSV is higher than 10.0 $h^{-1}$, hydrotreating and hydro-isomerization tend not to sufficiently proceed. Examples of a ratio of hydrogen/oil include 50 to 1000 NL/L, and 70 to 800 NL/L is preferable. If the ratio of hydrogen/oil is lower than 50 NL/L, hydrotreating and hydro-isomerization tend not to sufficiently proceed, on the other hand, if the ratio of hydrogen/oil is higher than 1000 NL/L, a large-sized hydrogen feeding apparatus and the like tend to be needed.

A effluent oil from the middle distillate hydrotreating reactor C8, from which a gas fraction mainly containing unreacted hydrogen gas has been separated in the gas liquid separator D12 connected to the line L30, is transferred through the line L32, and mixes with the hydrocracking product of the liquid wax fraction transferred by the line L26. The gas fraction mainly containing hydrogen gas separated in the gas liquid separator D12 is fed to the hydrocracking apparatus C6, and reused.

(Step S6)

The raw naphtha fraction evacuated from the first fractionator C4 by the line L20 is heated, with the hydrogen gas fed by a feed line (not shown) of the hydrogen gas connected to the line L20, to a temperature needed for hydrotreating of the raw naphtha fraction by a heat exchanger H8 installed in the line L20, and then fed to the naphtha fraction hydrotreating apparatus C10 to be hydrotreated.

The type of the naphtha fraction hydrotreating apparatus 10 is not particularly limited, and a fixed bed flow reactor packed with a hydrotreating catalyst is preferably used. The reactor may be singular, or a plurality of reactors may be provided in serial or in parallel. Moreover, the catalyst bed within the reactor may be singular or plural.

The hydrotreating catalyst used for the naphtha fraction hydrotreating apparatus 10 is not particularly limited, but the hydrotreating catalyst may be the same hydrotreating catalyst as that used for hydrotreating of the raw middle distillate.

In the naphtha fraction hydrotreating apparatus C10, unsaturated hydrocarbons contained in the raw naphtha fraction (which contains normal paraffins with approximately $C_5$ to $C_{10}$ as a main component) are converted into paraffin hydrocarbons by hydrogenation. Moreover, oxygen-containing compounds contained in the raw naphtha fraction, such as alcohols, are converted into paraffin hydrocarbons and water by hydrogenation deoxidation. It is to be noted that, in the naphtha fraction, the hydro-isomerization reaction does not proceed much because a carbon number is small.

The reaction condition in the naphtha fraction hydrotreating apparatus C10 is not limited, but the same reaction condition as that in the middle distillate hydrotreating apparatus C8 can be selected.

The effluent oil of the naphtha fraction hydrotreating apparatus C10 is fed through a line L34 to a gas liquid separator D14, and in the gas liquid separator D14, the effluent oil is separated into the gas fraction in which hydrogen gas is a main component, and liquid hydrocarbons. The gas fraction obtained by this separation is fed to the hydrocracking apparatus C6, and the hydrogen gas contained in this is reused. On the other hand, the liquid hydrocarbons obtained by this separation are transferred through a line L36 to the naphtha stabilizer C14. Moreover, a part of the liquid hydrocarbons is recycled through a line L48 to the line L20 upstream of the naphtha fraction hydrotreating apparatus C10. Because an amount of heat to be generated in hydrotreating of the raw naphtha fraction (hydrogenation of olefins and hydrogenation deoxidation of alcohols and the like) is large, a part of the liquid hydrocarbons is recycled to the naphtha fraction hydrotreating apparatus C10 and the raw naphtha fraction is diluted, thereby suppressing increase in the temperature in the naphtha fraction hydrotreating apparatus C10.

In the naphtha stabilizer C14, the liquid hydrocarbons fed from the naphtha fraction hydrotreating apparatus C10 and the second fractionator C12 are fractionated to obtain refined naphtha with carbon number of $C_5$ to $C_{10}$ as a product. The refined naphtha is transferred from the bottom of the naphtha stabilizer C14 through a line L46 to a naphtha tank T6, and stored. On the other hand, from a line L50 connected to a top of the naphtha stabilizer C14, hydrocarbon gas in which hydrocarbons with carbon number of a predetermined number or less ($C_4$ or less) are a main component is discharged. Because the hydrocarbon gas is not a target product, the hydrocarbon gas is introduced into an external burning facility (not shown) to be burned, and then discharged into the air.

(Step S7)

A mixed oil comprising the liquid hydrocarbons obtained from the effluent oil from the hydrocracking apparatus C6 and the liquid hydrocarbons obtained from the effluent oil from the middle distillate hydrotreating apparatus C8 is heated by a heat exchanger H10 provided in the line L32, and then fed to the second fractionator C12 to be fractionated into hydrocarbons having approximately $C_{10}$ or less, a kerosene fraction, a gas oil fraction, and an uncracked wax fraction. The hydrocarbons having approximately $C_{10}$ or less with a boiling point of lower than about 150° C. are evacuated from a top of the second fractionator C12 by a line L44. The kerosene fraction with a boiling point of about 150 to 250° C. is evacuated from a central portion of the second fractionator C12 by a line L42 to be stored in a tank T4. The gas oil fraction with a boiling point of about 250 to 360° C. is evacuated from a lower portion of the second fractionator C12 by a line L40 to be stored in a tank T2. The uncracked wax fraction with a boiling point of higher than about 360° C. is evacuated from a bottom of the second fractionator C12 to be recycled by the line L38 to the line L12 upstream of the hydrocracking apparatus C6. The hydrocarbons having approximately $C_{10}$ or less evacuated from the top of the second fractionator C12 are fed by the lines L44 and L36 to the naphtha stabilizer, and fractionated with the liquid hydrocarbons fed from the naphtha fraction hydrotreating apparatus C10.

The production system 100 is temporarily stopped for a periodic check of each apparatus and line, catalyst replacement of the FT synthesis catalyst, or the like. The operation of the stopped production system 100 is restarted by the method for starting up a slurry bubble column reactor according to the present embodiment, the method comprising the following Steps S8 to S11.

In Step S8, during the operation of the production system 100, the raw wax fraction obtained from the first fractionator C4 in Step S3 is fed via the transferring line L60 to the raw wax storage tank T8, and stored therein. The raw wax storage tank T8 is preferably kept warm at about 120° C. for ensuring fluidity. It is preferable as a storing condition to store the raw wax fraction for a short period in a state that an inert gas seal is formed to restrict the raw wax fraction from being contact with moisture.

In Step S9, the raw wax stored in the raw wax storage tank T8 is fed to the hydrocracking apparatus C6 to be subjected to hydrocracking, and the resulting hydrocracking product is fed via the transferring line L64 to the hydroprocessed oil storage tank T10 and stored therein. Alternatively, a bottom oil (uncracked wax fraction) of the second fractionator C12, which is obtained by fractionating the hydrocracking product in the second fractionator C12, may be fed to the hydroprocessed oil storage tank T10.

As a hydrocracking condition, examples of a hydrogen partial pressure include 0.5 to 12 MPa, and 1.0 to 5.0 MPa is preferable. Examples of a liquid hourly space velocity (LHSV) include 0.1 to 10.0 $h^{-1}$, and 0.3 to 3.5 $h^{-1}$ is preferable. A ratio of hydrogen gas/wax fraction (a ratio of hydrogen gas/oil) is not particularly limited, but examples thereof include 50 to 1000 NL/L, and 70 to 800 NL/L is preferable. Here, the "LHSV (liquid hourly space velocity)" means a total volume flow rate of the wax fraction and the bottom oil of the second fractionator C12 to be fed again at the normal state (25° C., 101325 Pa) per capacity of a bed comprising a catalyst packed in a fixed bed flow reactor (catalyst bed), and the unit "$h^{-1}$" is an inverse of a time. In addition, the unit "NL" of a hydrogen gas capacity in the ratio of hydrogen gas/oil denotes a hydrogen gas capacity (L) at the normal state (0° C., 101325 Pa).

Furthermore, examples of a reaction temperature (weight average catalyst bed temperature) can include 180° C. to 400° C., preferably 200° C. to 370° C., more preferably 250° C. to 350° C., and further preferably 280° C. to 350° C. If the reaction temperature is higher than 400° C., the hydrocracking excessively proceeds, and the yield of the middle distillate intended tends to be reduced. On the other hand, if the reaction temperature is lower than 180° C., the oxygen-containing compounds such as alcohols in the wax fraction tend not to be sufficiently removed.

The hydrocracking product may have any composition as long as it contains 40% by mass or more of paraffin hydrocarbons having carbon number of 21 or more, but if it contains alcohols and olefins at a high concentration, peroxides tend to be produced and alcohols and olefins are contained in a light fraction in a larger amount, and thus, the hydrocracking product preferably contains 80% by mass or more, more preferably even 90% by mass or more of paraffin hydrocarbons having carbon number of 21 or more.

A storing period can be set by using the peroxide value as an index. Here, the peroxide value refers to a quantitative value (ppm) obtained by reacting peroxide produced by incorporation of oxygen in air by a fat and oil or a mineral oil with potassium iodide and titrating free iodine with a sodium thiosulfate solution. The peroxide value is measured as the following procedure. First, a sample is precisely weighed and taken, and loaded in a stoppered conical flask, and a mixed liquid of chloroform-glacial acetic acid (2:3) is added thereto to dissolve the sample. If the sample is not dissolved uniformly, the mixed liquid of chloroform-glacial acetic acid is further added thereto in an appropriate amount. Then, a saturated potassium iodide solution is added thereto while nitrogen gas or carbon dioxide gas passing to a gaseous phase in the flask, the flask is immediately stoppered and the content therein is mixed for a few minutes, and then the resultant is titrated with a sodium thiosulfate solution using a starch test solution as an indicator.

In Step S10, the hydroprocessed oil which contains 40% by mass or more of paraffin hydrocarbons having carbon number of 21 or more and has a peroxide value of 1 ppm or less is fed from the hydroprocessed oil storage tank T10 to the slurry bubble column reactor C2. If the peroxide value is more than 1 ppm, the FT synthesis catalyst is oxidized by peroxide in a starting up slurry and activity thereof is reduced.

In the present embodiment, it is more preferable that the peroxide value of the hydroprocessed oil be measured before feeding and it be confirmed to be 1 ppm or less.

In Step S11, the slimy bubble column reactor C2 with the hydroprocessed oil fed is operated.

After Steps S8 to S11, Steps S1 to S7 are performed to produce a hydrocarbon oil.

In the foregoing, the suitable embodiment of the method for starting up a slurry bubble column reactor according to the present invention is described, but the present invention is not intended to be necessarily limited to the above-described embodiment.

For example, in Steps S9 and S10, as long as the hydrocracking product discharged from the hydrocracking apparatus C6 satisfies that it contains 40% by mass or more of paraffin hydrocarbons having carbon number of 21 or more and has a peroxide value of 1 ppm or less, the resulting hydrocracking product may be directly fed to the slurry bubble column reactor C2 without being stored in the hydroprocessed oil storage tank T10.

As another aspect, a hydroprocessed oil with an antioxidant formulated therein can be stored in the hydrocracking product discharged from the hydrocracking apparatus C6 or the bottom oil (uncracked wax fraction) obtained in the second fractionator C12, and this hydroprocessed oil can be fed to the slurry bubble column reactor C2 to start the operation. In this case, an amount of the antioxidant formulated and a storing period of the hydroprocessed oil are preferably set so that a peroxide value of the hydroprocessed oil fed to the slurry bubble column reactor C2 is 1 ppm or less. In the present embodiment, it is more preferable that the peroxide value of the hydroprocessed oil be measured before feeding and it be confirmed to be 1 ppm or less.

Examples of the antioxidant include dibutylhydroxytoluene (BHT). The amount of the antioxidant formulated is preferably about 20 ppm.

As still another aspect, for example, while the hydrocracking product discharged from the hydrocracking apparatus C6 or the uncracked wax fraction obtained in the second fractionator C12 is being stored, the hydroprocessed oil can be fed to the slurry bubble column reactor C2 to start the operation within a period that the peroxide value of the hydroprocessed oil does not exceed 1 ppm.

Then, a solvent for start-up according to the present invention will be described.

A solvent for start-up according to the present invention is a solvent for start-up for use in starting operation of a slurry bubble column reactor for producing hydrocarbons by the Fischer-Tropsch synthesis reaction, the solvent comprising a hydroprocessed oil produced in the slurry bubble column reactor and hydroprocessed that contains 40% by mass or more of paraffin hydrocarbons having carbon number of 21 or more and that has a peroxide value of 1 ppm or less.

Such a solvent for start-up can be obtained in Steps S8 and S9 described above, for example. Moreover, the solvent can be produced by formulating the antioxidant to the hydrocracking product discharged from the hydrocracking apparatus C6 or the uncracked wax fraction obtained in the second fractionator C12.

Since peroxide tends to be produced if the solvent contains oxygen-containing compounds at a high concentration, it is preferable that the concentration of the oxygen-containing compounds such as alcohols in the solvent for start-up be 3% by mass or less.

EXAMPLES

Hereinafter, the present invention will be more specifically described by Examples, but the present invention is not intended to be limited to the following Examples.

Example 1

A raw wax (alcohols: 3.3% by mass, normal paraffins: 92.5% by mass, olefins: 4.2% by mass) obtained by fractionating a produced oil obtained by setting a reaction temperature of the FT synthesis reaction to 210° C. was prepared. This raw wax was brought into contact with a hydrocracking catalyst (platinum: 0.8% by mass/silica alumina (30% by mass)-USY zeolite (10% by mass)-alumina binder (60% by mass)) under a stream of hydrogen to be subjected to hydrocracking under a condition where a reaction temperature was 290° C., a ratio of hydrogen/oil was 340 NL/L, LHSV=2.0 h$^{-1}$, and a cracking rate defined by the following formula was 10%.

Cracking rate(% by mass)=((weight of fraction with boiling point of lower than 360° C. in produced oil)/(weight of fraction with boiling point of 360° C. or higher in produced oil))×100

Here, the cracking rate was calculated from a result obtained by analyzing the produced oil by a gas chromatographic method.

The produced oil obtained as described above was distilled to obtain a hydroprocessed oil including a wax (content of paraffin hydrocarbons having carbon number of 21 or more: 91.9% by mass). A concentration of oxygen-containing compounds contained in the hydroprocessed oil was measured by a gas chromatographic method, and as a result, it was 0% by mass. Moreover, a peroxide value of the above-described hydroprocessed oil was measured by the following method. First, 0.5 g of the hydroprocessed oil was precisely weighed and taken, and loaded in a stoppered conical flask, and a mixed liquid of chloroform-glacial acetic acid (2:3) was added thereto to dissolve the sample. Then, a saturated potassium iodide solution was added thereto while nitrogen gas passing to a gaseous phase in the flask, the flask is immediately stoppered, the content therein is mixed for 1 minute, then the resultant is titrated with a 0.01 N sodium thiosulfate solution using a starch test solution as an indicator to measure a peroxide value, and as a result, the peroxide value was 0 ppm.

The hydroprocessed oil obtained as described above was used as a solvent for start-up, and mixed with an activated FT synthesis catalyst comprising cobalt (30% by mass)/silica (70% by mass) obtained by reduction to form a slurry, and the slurry was charged into a slurry bubble column reactor. Then, the FT synthesis reaction was performed under a condition where mixed gas of hydrogen gas/carbon monoxide gas of 2/1 (molar ratio) was used as a raw material, W (mass of catalyst)/F (flow rate of synthesis gas)=3 g·h/mol, a reaction temperature was 230° C. and a pressure was 2.3 MPa, and a CO conversion at an initial stage of the reaction was measured. The CO conversion was 75%. The above results are shown in Table 1.

Comparative Example 1

A raw wax obtained as in Example 1 was stored for 1 month after the FT synthesis and fractionation, and then used as a solvent for start-up. A concentration of oxygen-containing compounds and a peroxide value of this raw wax were measured as in Example 1, and they were 3.28% and 10 ppm, respectively.

This raw wax was mixed with the same activated FT synthesis catalyst as that used in Example 1 to foam a slurry, and the slurry was charged into a slurry bubble column reactor. Then, the FT synthesis reaction was performed as in Example 1. CO conversion at an initial stage of the reaction was measured, and it was 72%. The above results are shown in Table 1.

Comparative Example 2

A hydroprocessed oil obtained as in Example 1 was stored for 2 months, and used as a solvent for start-up. A concentration of oxygen-containing compounds and a peroxide value of this solvent for start-up were measured, and they were 0% by mass and 7 ppm, respectively.

The FT synthesis reaction was performed as in Example 1 except that the described-above solvent for start-up was used. CO conversion at an initial stage of the reaction was measured, and it was 73%. The above results are shown in Table 1.

Reference Example 1

A peroxide value of a commercially available paraffin wax (containing 20 ppm of an antioxidant) was measured, and it was 0 ppm. The FT synthesis reaction was performed as in Example 1 except that this commercially available paraffin wax was used as a solvent for start-up. CO conversion at an initial stage of the reaction was measured, and it was 75%. The results are shown in Table 1.

TABLE 1

| | Example 1 | Comparative Example 1 | Comparative Example 2 | Reference Example 1 |
|---|---|---|---|---|
| Concentration of oxygen-containing compounds in solvent for start-up (% by mass) | 0 | 3.28 | 0 | — |
| Peroxide value of solvent for start-up (ppm) | 0 | 10 | 7 | 0 |
| Initial CO conversion (%) | 75 | 72 | 73 | 75 |

INDUSTRIAL APPLICABILITY

According to the present invention, a method for starting up a slurry bubble column reactor, a solvent for start-up, and a process for producing a hydrocarbon oil which can produce a hydrocarbon oil with efficiency and low cost, which can sufficiently maintain the activity of the catalyst for the Fischer-Tropsch synthesis reaction using the slurry bubble column reactor and reduce the cost needed for starting up the reactor can be provided.

REFERENCE SIGNS LIST

C2 . . . Slurry bubble column reactor, C4 . . . First fractionator, C6 . . . Hydrocracking apparatus, C8 . . . Middle distillate hydrotreating apparatus, C10 . . . Naphtha fraction hydrotreating apparatus, C12 . . . Second fractionator, L60, 62, 64, 66 . . . Transfer line, T8 . . . Raw wax storage tank, T10 . . . Hydroprocessed oil storage tank, 100 . . . System for producing hydrocarbon oil.

The invention claimed is:

1. A method for starting up a slurry bubble column reactor, comprising, when restarting operation of a slurry bubble column reactor for producing hydrocarbons by the Fischer-Tropsch synthesis reaction, feeding to the slurry bubble column reactor a hydroprocessed oil produced in the slurry bubble column reactor and then hydroprocessed, containing 40% by mass or more of paraffin hydrocarbons having carbon number of 21 or more, and having a peroxide value of 1 ppm or less.

2. A solvent for start-up for use in starting operation of a slurry bubble column reactor for producing hydrocarbons by the Fischer-Tropsch synthesis reaction, the solvent comprising a hydroprocessed oil produced in the slurry bubble column reactor and hydroprocessed, containing 40% by mass or more of paraffin hydrocarbons having carbon number of 21 or more, and having a peroxide value of 1 ppm or less.

3. A process for producing a hydrocarbon oil using a slurry bubble column reactor for producing hydrocarbons by the Fischer-Tropsch synthesis reaction, comprising
performing restarting operation of the reactor by the starting up method according to claim 1.

* * * * *